US010589301B2

(12) United States Patent
Dalton et al.

(10) Patent No.: US 10,589,301 B2
(45) Date of Patent: Mar. 17, 2020

(54) CHECK VALVE WITH NONLINEAR FORCE LOAD FOR HVLP SPRAYING

(71) Applicant: Graco Minnesota Inc., Minneapolis, MN (US)

(72) Inventors: James M. Dalton, Maple Grove, MN (US); Brian M. Mulgrew, St. Francis, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 42 days.

(21) Appl. No.: 15/875,723

(22) Filed: Jan. 19, 2018

(65) Prior Publication Data

US 2018/0207655 A1    Jul. 26, 2018

Related U.S. Application Data

(60) Provisional application No. 62/449,084, filed on Jan. 22, 2017.

(51) Int. Cl.
*B05B 7/12* (2006.01)
*B05B 7/00* (2006.01)
(Continued)

(52) U.S. Cl.
CPC .......... *B05B 7/1281* (2013.01); *B05B 1/3006* (2013.01); *B05B 7/0081* (2013.01);
(Continued)

(58) Field of Classification Search
CPC ... B05B 7/1281; B05B 7/0081; B05B 7/0416; B05B 7/2416; B05B 1/3006;
(Continued)

(56) References Cited

U.S. PATENT DOCUMENTS 1,615,279 A * 1/1927 Iversen .................. F16K 15/12
137/516.15
1,747,332 A   2/1930 Summers
(Continued)

FOREIGN PATENT DOCUMENTS

CN    2213898 Y    11/1995
CN   101378838 A    3/2009
(Continued)

OTHER PUBLICATIONS

Extended European Search Report for EP Application No. 18152695.5, dated Jun. 20, 2018, 8 pages.
(Continued)

*Primary Examiner* — Arthur O. Hall
*Assistant Examiner* — Tuongminh N Pham
(74) *Attorney, Agent, or Firm* — Kinney & Lange, P.A.

(57) ABSTRACT

A high-volume low-pressure spray system includes a hose disposed between a compressor and a spray gun. The hose acts as an accumulator when the spray gun is deactivated. A check valve is disposed in a fitting connecting the hose to the compressor. The check valve includes a spring that applies a nonlinear force to a downstream end of a valve member, such that the valve member tips open in response to the pressure differential, providing a variable flowpath opening through the check valve.

20 Claims, 8 Drawing Sheets

(51) Int. Cl.
*F16K 15/02* (2006.01)
*F16K 27/02* (2006.01)
*B05B 1/30* (2006.01)
*B05B 7/24* (2006.01)
*B05B 7/04* (2006.01)
*B05B 12/00* (2018.01)

(52) U.S. Cl.
CPC .......... *B05B 7/0416* (2013.01); *B05B 7/2416* (2013.01); *B05B 12/002* (2013.01); *B05B 12/008* (2013.01); *F16K 15/026* (2013.01); *F16K 27/0209* (2013.01); *B05B 7/2437* (2013.01)

(58) Field of Classification Search
CPC ... B05B 12/002; B05B 12/008; B05B 7/2437; F16K 15/026; F16K 15/0209; F16K 15/033; Y10T 137/7898; Y10T 137/7901; Y10T 137/7922; Y10T 137/7925; Y10T 137/7936
USPC ................. 137/527, 527.4, 535, 538, 543.17
See application file for complete search history.

(56) References Cited

U.S. PATENT DOCUMENTS

| | | | |
|---|---|---|---|
| 1,800,185 A * | 4/1931 | Thrush ................ | F16K 17/0466 137/543.17 |
| 1,943,670 A | 1/1934 | Hewitt | |
| 2,208,188 A | 7/1940 | Johnston | |
| 2,223,944 A | 12/1940 | Roy | |
| 2,603,452 A | 7/1952 | Spinney | |
| 2,888,035 A | 5/1959 | Thomas | |
| 3,465,787 A | 9/1969 | Gulick | |
| 3,878,861 A * | 4/1975 | Pareja ................... | F16K 15/025 137/543.17 |
| 3,903,923 A | 9/1975 | Loup et al. | |
| 5,074,467 A * | 12/1991 | Geberth ................ | B05B 7/0081 200/81.9 R |
| 5,141,024 A | 8/1992 | Hicks | |
| 5,226,445 A | 7/1993 | Surjaatmadja | |
| 5,645,264 A | 7/1997 | Kah, Jr. | |
| 6,431,846 B1 | 8/2002 | Zinck | |
| 6,491,113 B1 | 12/2002 | Heinrichs | |
| 6,915,813 B2 | 7/2005 | Kobes | |
| 2003/0011136 A1* | 1/2003 | Ramirez ................ | F16K 1/446 277/500 |
| 2005/0092374 A1* | 5/2005 | Kim ...................... | F04B 39/102 137/543.17 |
| 2011/0121103 A1 | 5/2011 | Carleton et al. | |
| 2016/0053904 A1 | 2/2016 | Huang et al. | |

FOREIGN PATENT DOCUMENTS

| | | |
|---|---|---|
| GB | 2423034 A | 8/2006 |
| JP | H0828618 A | 2/1996 |
| JP | 2012047291 A | 3/2012 |
| JP | 2017015169 A | 1/2017 |

OTHER PUBLICATIONS

First Chinese Office Action for CN Application No. 2018100610975, dated Dec. 17, 2019, pp. 26.

* cited by examiner

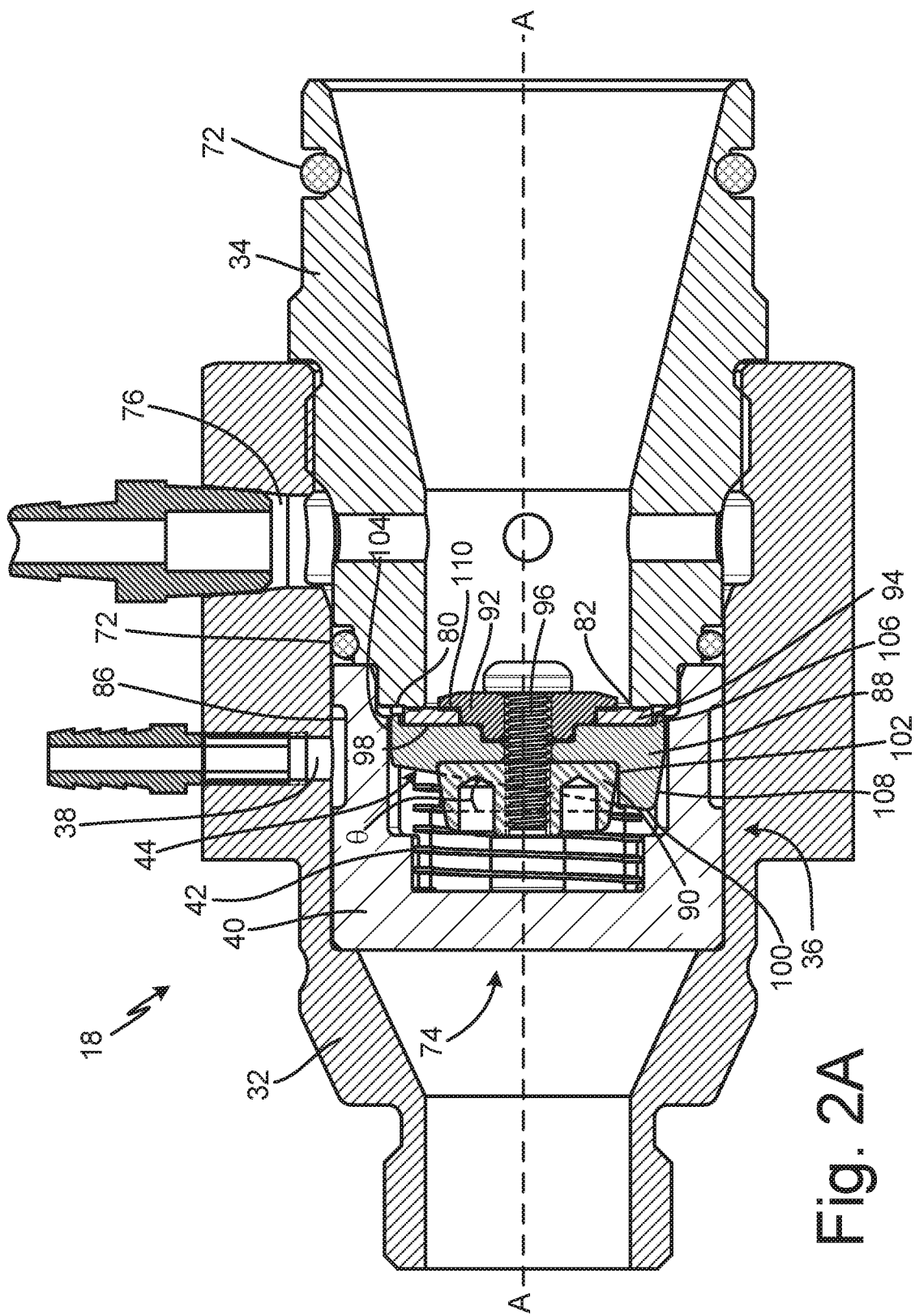

CHECK VALVE WITH NONLINEAR FORCE LOAD FOR HVLP SPRAYING

CROSS-REFERENCE TO RELATED APPLICATION(S)

This application claims priority to U.S. Provisional Application No. 62/449,084 filed Jan. 22, 2017, and entitled "CHECK VALVE WITH NONLINEAR FORCE LOAD FOR HVLP SPRAYING," the disclosure of which is hereby incorporated in its entirety.

BACKGROUND

This disclosure relates generally to check valves. More specifically, this disclosure relates to check valves for a high-volume low-pressure ("HVLP") spray system.

HVLP spray systems produce a high volume of air flow at low pressures to apply a spray of fluid, such as paint, water, oil, stains, finishes, coatings, solvents, and solutions, among others, to a surface. A compressor typically drives compressed air to a spray gun to generate the spray of fluid. The high volume and low pressure of the compressed air provided to the spray gun can cause check valves between the compressor and the spray gun to behave in an unstable manner. For example, the check valve can be pressure-activated based on a pressure differential between a downstream (closer to the spray gun) pressure and an upstream (closer to the compressor) pressure. When the user activates the spray gun, the downstream pressure can drop rapidly causing the check valve to open, but the compressor can quickly equalize the pressure, causing the check valve to close. The check valve closing leads to a rapid drop in downstream pressure, again causing the check valve to open. The rapid opening and closing of the check valve can cause chattering within the check valve, which can lead to excessive noise, wear, and an oscillating air supply.

SUMMARY

According to one aspect of the disclosure, a high-volume low-pressure spray system for spraying a fluid includes an air control unit configured to generate a flow of pressurized air, a spray gun configured to spray the fluid with the flow of pressurized air, a hose extending from the air control unit and configured to provide the flow of pressurized air from the air control unit to the spray gun, and a check valve. The check valve includes a seat, a valve member movable between a closed position in which the valve member is engaged with a seat and a modulated position in which the valve member is tipped partially off of the seat while a portion of the valve member is still engaged with the seat, and a spring that pushes the valve member into the closed position. The spring is configured to be overcome by the flow of the pressurized air such that the flow of the pressurized air moves the valve member to the modulated position.

According to another aspect of the disclosure, a check valve includes a cage, a seat disposed at an upstream end of the cage, a spring disposed within the cage between a downstream end of the cage and the seat, and a valve member disposed within the cage between the spring and the seat, the valve member including a downstream face facing the spring and an upstream face facing the seat. The spring is configured to apply a nonlinear force to the downstream face of the valve member. The valve member is configured to tilt to the modulated position prior to sliding to the open position when actuating from the closed position to the open position, and a portion of an upstream face of the valve member maintains engagement with a seat when the valve member is in the modulated position and another portion of the upstream face is disengaged from the seat when in the modulated position

BRIEF DESCRIPTION OF THE DRAWINGS

FIG. 2A is a cross-sectional view of a check valve showing the check valve in the closed position.

DETAILED DESCRIPTION

Figure 1A:
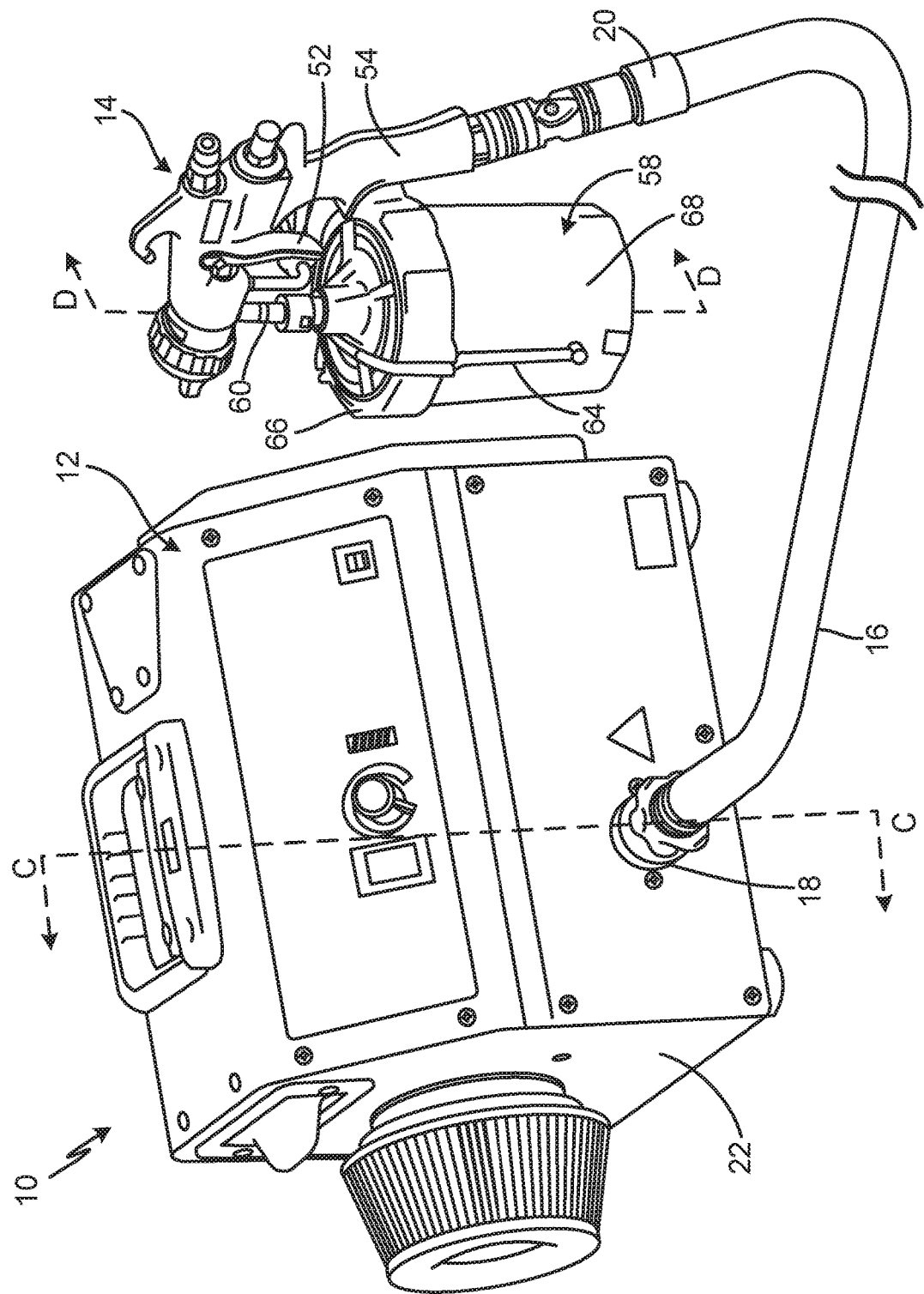
FIG. 1A is an isometric view of an HVLP spray system.
Figure 1B:
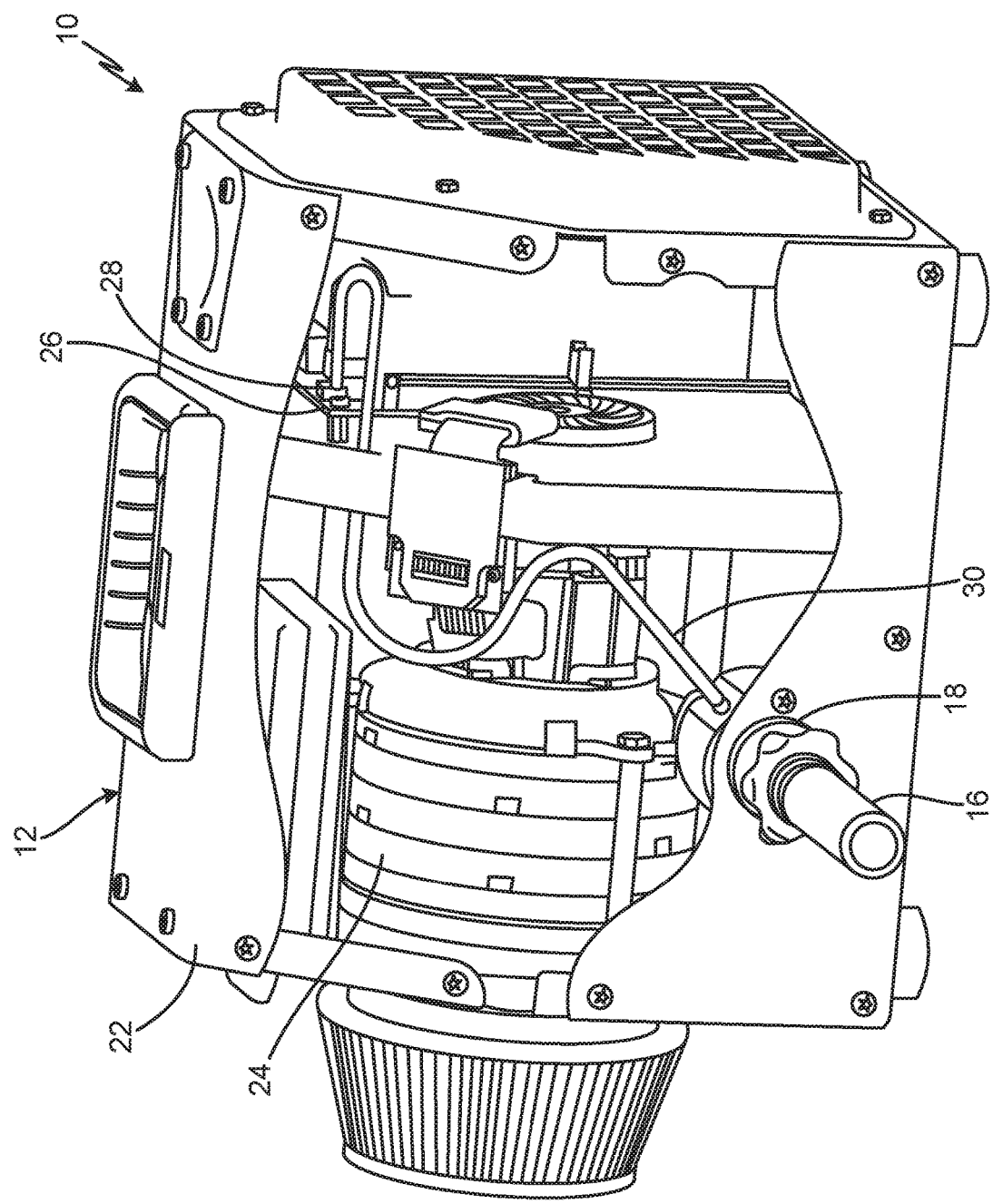
FIG. 1B is an isometric view of an HVLP spray system with a portion of the air housing cut away.
Figure 1C:
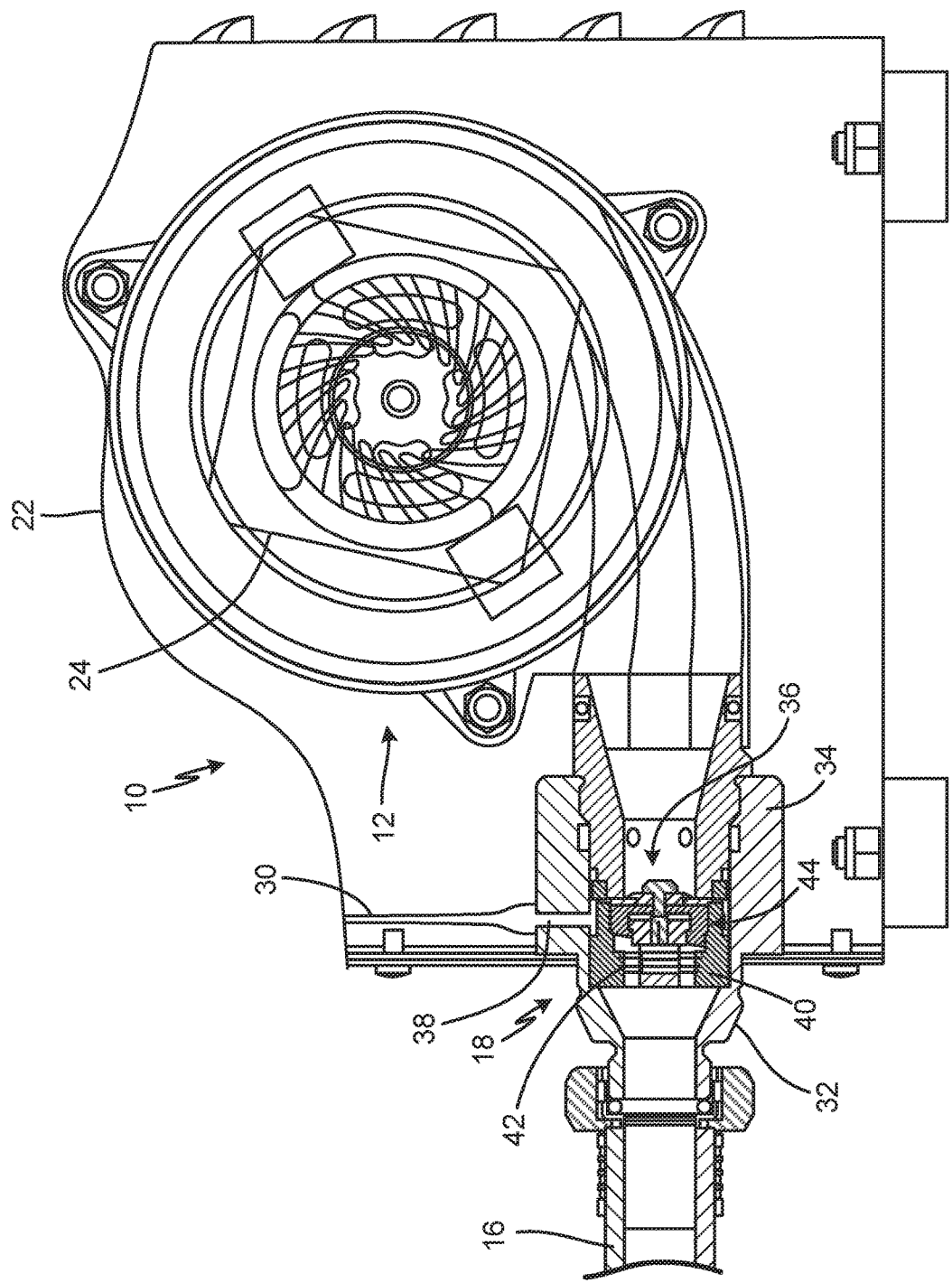
FIG. 1C is a cross-sectional view of the HVLP spray system of FIG. 1A taken along line C-C in FIG. 1A.
Figure 1D:
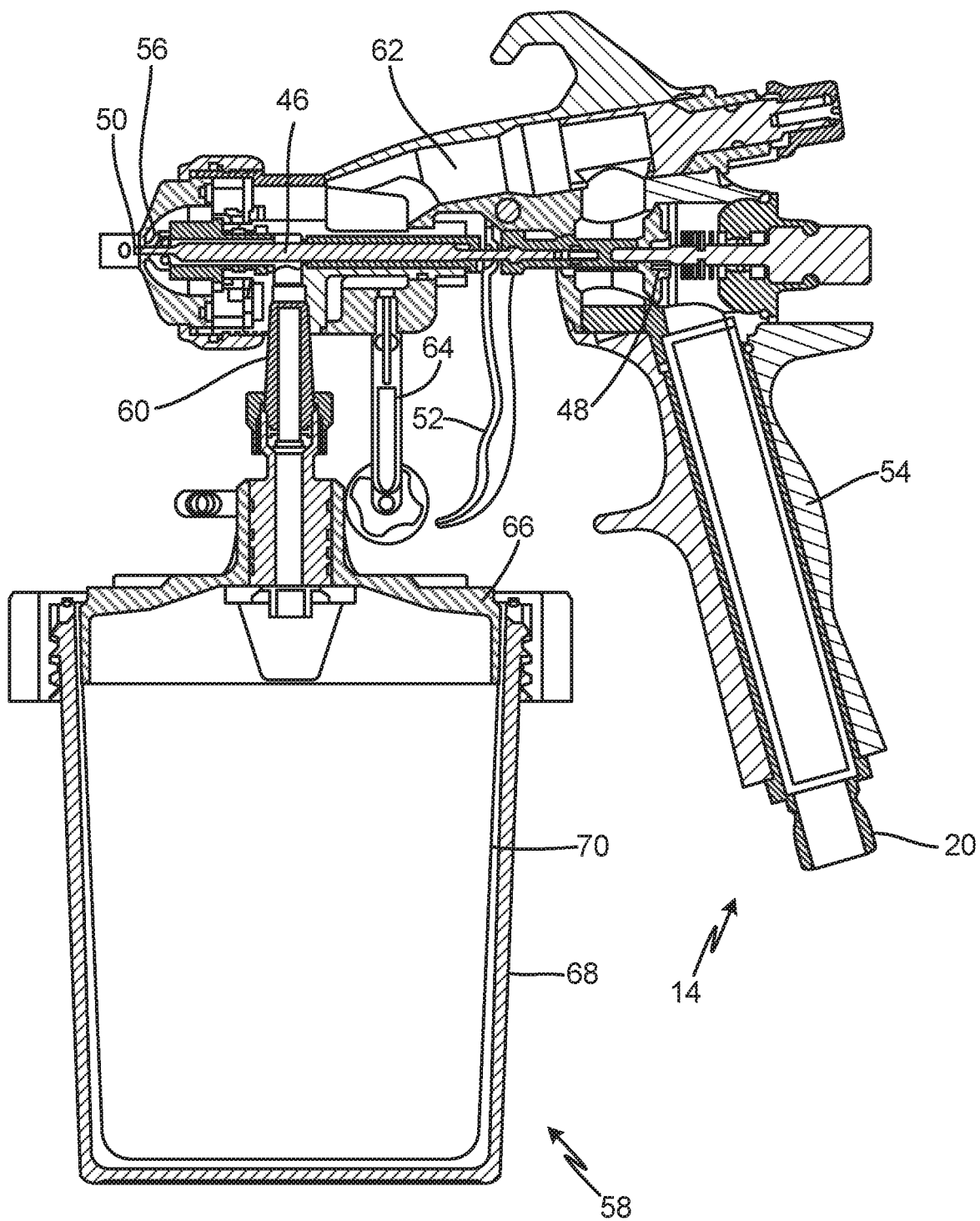
FIG. 1D is a cross-sectional view of the spray gun of the HVLP spray system of FIG. 1A taken along line D-D in FIG. 1A.

FIG. 1A is an isometric view of HVLP system 10. FIG. 1B is an isometric view of air unit 12 of HVLP system 10 with a portion cut away. FIG. 1C is a cross-sectional view of HVLP system 10 taken along line C-C in FIG. 1A. FIG. 1D is a cross-sectional view of spray gun 14 taken along line D-D in FIG. 1A. FIGS. 1A-1D will be discussed together. HVLP system 10, shown in FIG. 1A, includes air unit 12, spray gun 14, hose 16, first fitting 18, and second fitting 20. As shown in FIG. 1B, air unit 12 includes housing 22, compressor 24, control circuitry 26, pressure sensor 28, and sensor tube 30. As shown in FIG. 1C, first fitting 18 includes valve housing 32, valve inlet 34, and first check valve 36. Valve housing 32 includes pressure port 38. First check valve 36 includes cage 40, spring 42, and valve member 44. Spray gun 14, as shown in FIG. 1D, includes needle 46, second check valve 48, nozzle 50, trigger 52, handle 54, third check valve 56, reservoir 58, neck 60, chamber 62, and reservoir tube 64. Reservoir 58 includes lid 66, cup 68, and liner 70.

Air unit 12 provides pressurized air to spray gun 14 to atomize a fluid, such as paint, water, oil, stains, finishes, coatings, solvents, and solutions, among others, for application to a surface. Compressor 24 is disposed within air unit 12 and is configured to compress air and drive the compressed air downstream to spray gun 14. Hose 16 extends between air unit 12 and spray gun 14 and provides a fluid path for the compressed air to flow to spray gun 14. First fitting 18 is attached to air unit 12 and hose 16. Second fitting 20 is attached to spray gun 14 and hose 16. While first fitting 18 and second fitting 20 are described as attached to hose 16, it is understood that an intermediate fitting can be disposed between hose 16 and first fitting 18 and/or between hose 16 and second fitting 20. Compressor 24 provides compressed air to spray gun 14 through first fitting 18, hose 16, and second fitting 20. In some examples, compressor 24 can provide an air flow of about 0.05 m$^3$/s (about 100 ft$^3$/min.). Compressor 24 can be an impeller, or any other suitable device for compressing air, driven by an electric motor, and the electric motor can be controlled by control circuitry 26. Pressure sensor 28 is mounted on control circuitry 26, but it is understood that pressure sensor 28 can be located at any desired location.

Spray gun 14 is receives compressed air from hose 16 and dispenses an atomized spray of fluid through nozzle 50. Second fitting 20 is connected to handle 54 and hose 16 is configured to provide compressed air into spray gun 14 through handle 54. Needle 46 extends though spray gun 14 and is connected to trigger 52. Needle 46 is an elongate rod and is common to both second check valve 48 and third check valve 56 such that pulling trigger 52 causes needle 46 to shift, thereby opening both second check valve 48 and third check valve 56. Chamber 62 is disposed within spray gun 14 between second check valve 48 and third check valve 56. Chamber 62 receives compressed air from handle 54 and provides the compressed air to nozzle 50 and to reservoir tube 64. The pressurized air entering chamber can be at, for example, about 25-70 kPa (about 4-10 psi). Lid 66 of reservoir 58 is attached to neck 60. Cup 68 is attached to lid 66, and liner 70 is disposed within cup 68 and secured between lid 66 and cup 68. Liner 70 can store a volume of spray fluid. Reservoir tube 64 is connected to reservoir 58 and provides the compressed air to reservoir 58. The compressed air is contained between cup 68 and liner 70 and the increased pressure within cup 68 collapses liner 70 and drives the spray fluid out of reservoir 58 and to nozzle 50. While reservoir 58 is described as including liner 70, it is understood that reservoir 58 can store spray fluid directly in cup 68. In other examples, reservoir 58 can be mounted above spray gun 14 such that the flow of spray fluid into spray gun 14 is gravity-assisted.

First fitting 18 is disposed between compressor 24 and hose 16. Valve inlet 34 is fluidly connected to compressor 24 to receive the compressed air from compressor 24. Valve housing 32 is attached to hose 16 and is configured to provide the compressed air to hose 16. Valve inlet 34 extends into and is connected to valve housing 32. Pressure port 38 extends through valve housing 32 downstream of first check valve 36 and is fluidly connected to pressure sensor 28 by sensor tube 30.

First check valve 36 is disposed within first fitting 18 between compressor 24 and hose 16. First check valve 36 is a one-way valve configured to prevent the pressurized air from backflowing out of hose 16 and to compressor 24. Cage 40 is retained within valve housing 32 by valve inlet 34. Spring 42 is disposed within cage 40. Valve member 44 is disposed within cage 40 between spring 42 and valve inlet 34, such that spring 42 biases valve member 44 towards valve inlet 34. As such, valve inlet 34 can form the seat of first check valve 36. Spring 42 applies force to valve member 44 in a nonlinear manner about longitudinal axis A-A (shown in FIG. 2A). As such, less force is required to unseat one portion of valve member 44 from the seat than to unseat another portion of valve member 44 from the seat. In some examples, a downstream face of valve member 44 can include a slope such that spring 42 applies force to the downstream face in a nonlinear manner. In some examples, spring 42 can include a non-uniform pitch resulting in a non-uniform free length and a non-uniform force applied on valve member 44 by spring 42. The nonlinear force prevents valve member 44 from fully disengaging from valve inlet 34 due to the pressure differential between the upstream and downstream sides of first check valve 36, with upstream being closer to compressor 24 and downstream being closed to hose 16.

During operation, compressed air pressurizes reservoir 58 to drive the spray fluid into spray gun 14 and drives the spray fluid out of nozzle 50 in an atomized spray. The user depresses trigger 52, which causes needle 46 to shift in a rearward direction. Needle 46 shifting in the rearward direction opens a flowpath through second check valve 48 and through third check valve 56. With second check valve 48 open, the compressed air can flow into chamber 62 and to nozzle 50 and reservoir tube 64. The portion of compressed air that flows through reservoir tube 64 flows into cup 68 and pressurizes the spray fluid to drive the spray fluid to nozzle 50. The portion of compressed air that flows to nozzle 50 drives the spray fluid through third check valve 56 and out of nozzle 50 in an atomized spray.

Compressor 24 is configured to shut off or spin at low power when spray gun 14 is inactive, i.e. not dispensing fluid from nozzle 50. The user depressing trigger 52 causes control circuitry 26 to activate compressor 24. For example, pressure sensor 28 can sense a drop in the air pressure in hose 16 downstream of first check valve 36, indicating that spray gun 14 is dispensing the spray fluid. Control circuitry 26 causes compressor 24 to power up and to run at speed, thereby providing compressed air to spray gun 14.

To provide sufficient air pressure to spray the spray fluid as compressor 24 powers up, hose 16 acts as an accumulator and stores a volume of pressurized air between first check valve 36 and second check valve 48. When trigger 52 is depressed, the pressurized air in hose 16 flows through spray gun 14 and provides sufficient air pressure to atomize the spray out of nozzle 50 and to pressurize reservoir 58. Second check valve 48 is a manually-actuated check valve that shifts to the open position based on the user depressing trigger 52. First check valve 36 is a pressure-actuated check valve that shifts to the open position based on a pressure differential between upstream and downstream pressures. As discussed above, depressing trigger 52 opens second check valve 48 and third check valve 56 allowing the trapped air to flow out of hose 16 through spray gun 14. The drop in pressure downstream of first check valve 36 can be sensed by pressure sensor 28, which can cause compressor 24 to accelerate to full speed based on the drop in pressure. Compressor 24 increases the air pressure upstream of first check valve 36. The pressure differential at first check valve 36 overcomes the force of spring 42 and causes valve member 44 to shift open, allowing the compressed air to flow downstream through first check valve 36.

The nonlinear force applied to the downstream face of valve member 44 by spring 42 allows a portion of valve member 44 to shift open and out of contact with the seat, while another portion of valve member 44 remains closed and in contact with the seat. As such, valve member 44 can tip open to allow the compressed air to flow downstream through first check valve 36. Tipping valve member 44 open prevents chattering, which can occur when the valve member rapidly opens and closes due to varying pressure differentials. In addition, tipping valve member 44 open provides a variable opening through first check valve 36 responsive to the actual pressure differential.

When the user releases trigger 52, needle 46 shifts back to the position shown and both second check valve 48 and third check valve 56 are closed. The pressure in hose 16 rises and equalizes with the upstream pressure provided by compressor 24. Spring 42 is able to overcome the pressure differential and shifts valve member 44 back to the fully closed position. Hose 16 thus captures the volume of pressurized air between first check valve 36 and second check valve 48, and the captured air can be used for the next instance trigger 52 is depressed. Compressor 24 can be configured to continue to run for a set period of time after the trigger 52 is released before decelerating to a rest or idle state.

First check valve 36 provides significant advantages. Unlike a binary check valve, which is either fully open or fully closed, first check valve 36 opens a variable degree responsive to the pressure differential experienced by first check valve 36. The nonlinear force applied to valve member 44 allows valve member 44 to tip open to allow air to flow through first check valve. Tipping valve member 44 open provides a variable opening responsive to the pressure differential, which prevents excessive wear, noise, vibration, and an oscillating air supply to spray gun 14, among others.

Figure 2B:
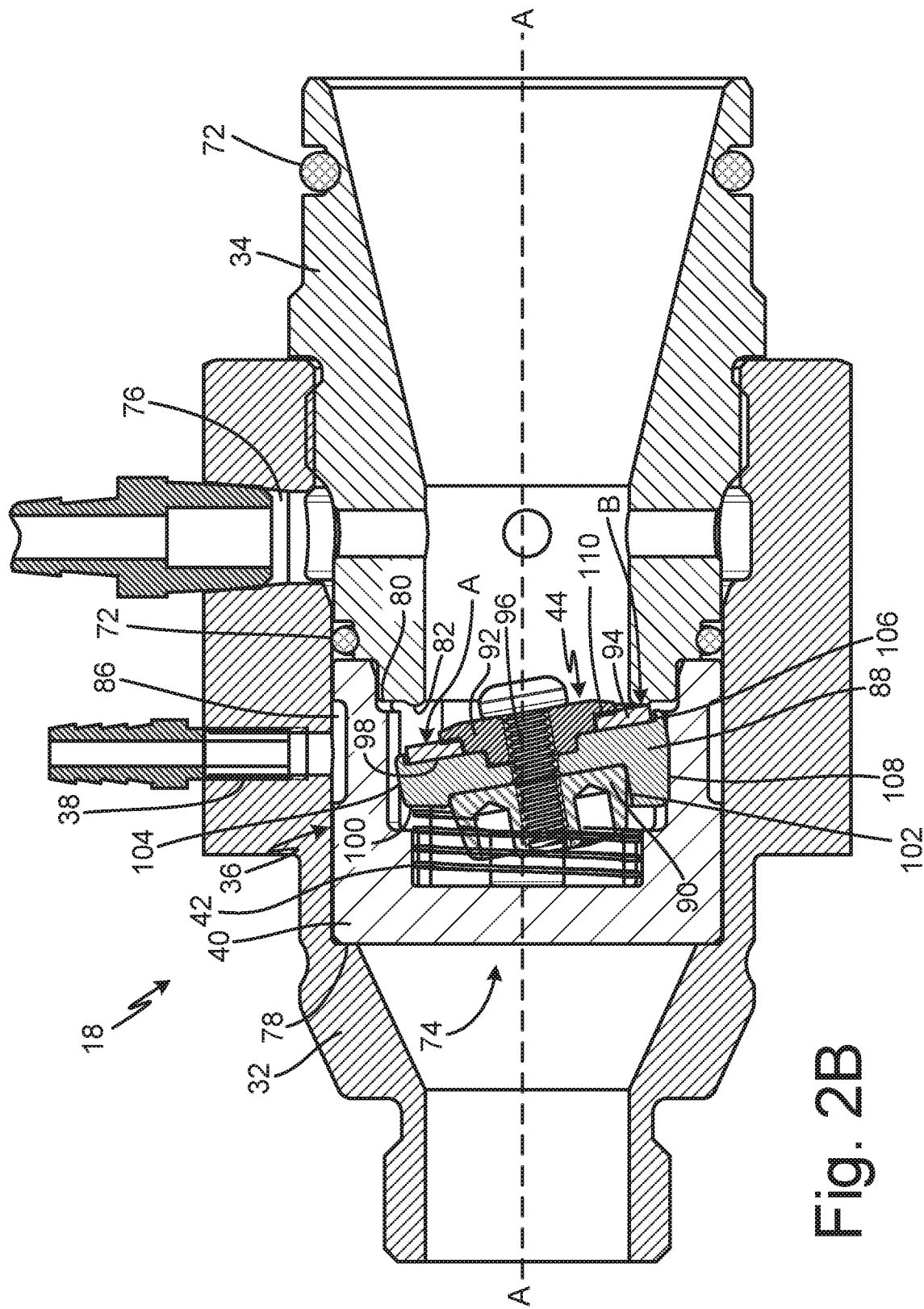
FIG. 2B is a cross-sectional view of a check valve showing the check valve in an open position.
Figure 2C:
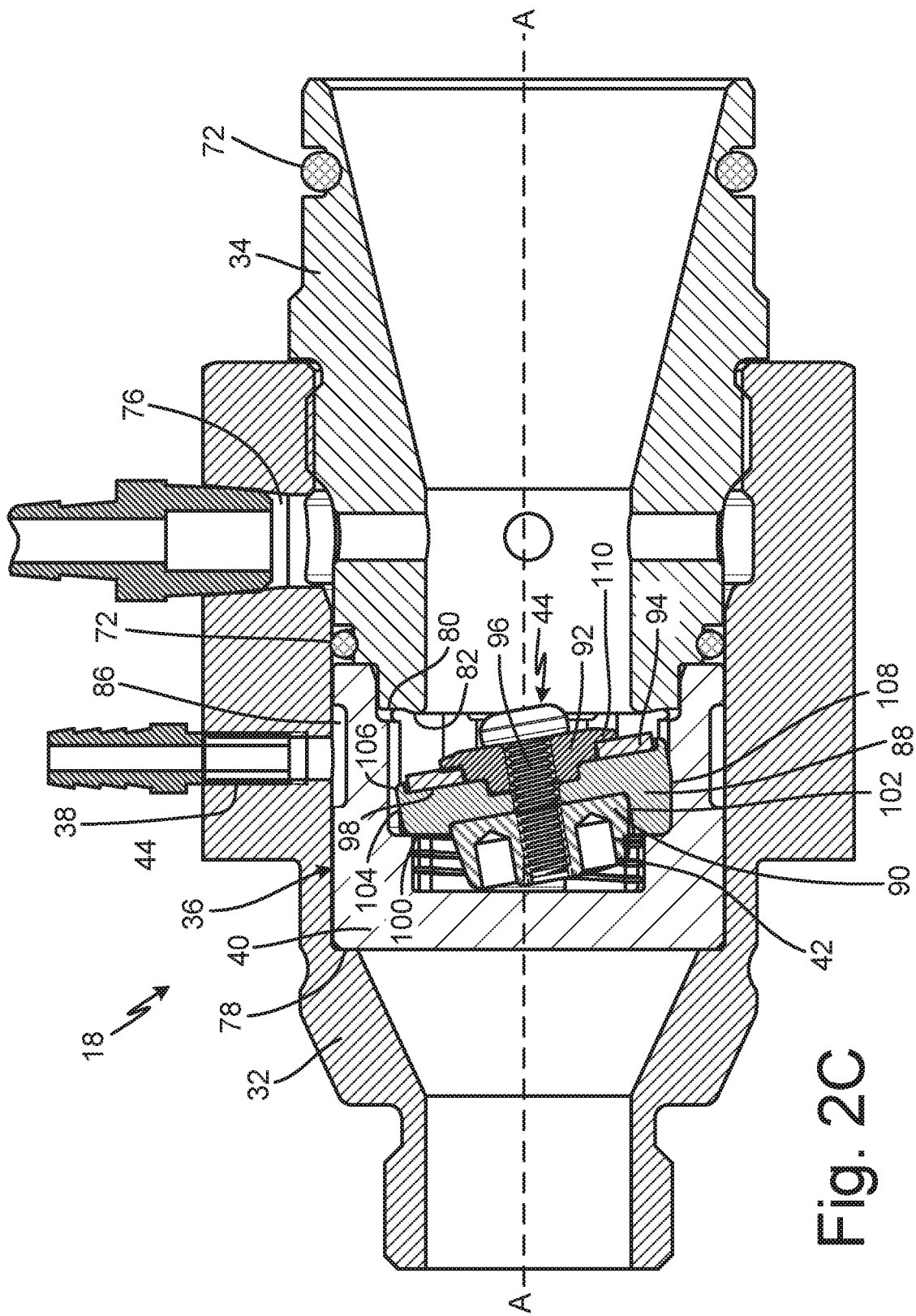
FIG. 2C is a cross-sectional view of a check valve showing the check valve in a displaced position.

FIG. 2A is a cross-sectional view of first fitting 18 showing first check valve 36 in a closed position. FIG. 2B is a cross-sectional view of first fitting 18 showing first check valve 36 in a modulated position. FIG. 2C is a cross-sectional view of first fitting 18 showing first check valve 36 in an open position. FIGS. 2A-2C will be discussed together. First fitting 18 includes valve housing 32, valve inlet 34, first check valve 36, and o-rings 72a and 72b. Valve housing 32 includes pressure port 38, central bore 74, and bleed port 76. Central bore 74 includes downstream lip 78. Valve inlet 34 includes downstream end 80. First check valve 36 includes cage 40, spring 42, valve member 44, and seat 82. Cage 40 includes flow openings 84 (shown in FIG. 3) and annular groove 86. Valve member 44 includes valve guide 88, end cap 90, retainer 92, gasket 94, and fastener 96. Valve guide 88 includes upstream face 98, downstream face 100, depression 102, and outer edge 104. Upstream face 98 includes axially-extending flange 106. Outer edge 104 includes taper 108. Retainer 92 includes radially-extending flange 110.

First check valve 36 is disposed within valve housing 32 and is retained in valve housing by valve inlet 34. Valve inlet 34 extends into central bore 74 and is attached to valve housing 32. In some examples, valve inlet 34 is attached to valve housing 32 by threading, but it is understood that valve inlet 34 can be attached to valve housing 32 in any suitable manner, such as by press fitting, for example. O-ring 72a is disposed between valve inlet 34 and valve housing 32. O-ring 72b is disposed around an upstream end of valve inlet 34 to provide a seal between valve inlet 34 and a compressor, such as compressor 24 (best seen in FIG. 1C). Pressure port 38 extends though valve housing 32 downstream of downstream end 80 of valve inlet 34. As such, pressure port 38 is disposed downstream of the sealing connection between first check valve 36 and valve inlet 34. Pressure port 38 can be connected to a pressure sensor, such as pressure sensor 28 (shown in FIG. 1B), to provide pressurized air from downstream of the interface between valve member 44 and valve inlet 34 to the pressure sensor. Bleed port 76 extends through valve housing 32 upstream of downstream end 80 of valve inlet 34. Bleed port 76 allows air to be bled from upstream of first check valve 36, thereby reducing the heat retained by first fitting 18.

Cage 40 is captured within central bore 74 between downstream end 80 of valve inlet 34 and downstream lip 78 of central bore 74. Annular groove 86 extends around cage 40 and is positioned adjacent pressure port 38. Spring 42 is disposed within cage 40. Valve member 44 is disposed within cage 40 between spring 42 and seat 82. Seat 82 is an annular projection integral with downstream end 80 of valve inlet 34. While seat 82 is described as integral with downstream end 80 of valve inlet 34, it is understood that seat 82 can be a separately formed from downstream end 80. Spring 42 biases valve member 44 towards the closed position shown in FIG. 3A, where gasket 94 abuts seat 82. In some examples, spring 42 is a flat wire coil spring. Cage 40, spring 42, valve member 44, and seat 82 are aligned on longitudinal axis A-A when in the closed position.

Retainer 92 is disposed adjacent upstream face 98 of valve guide 88. Gasket 94 is disposed on upstream face 98 of valve guide 88. Gasket 94 is radially retained between axially-extending flange 106 and retainer 92, and gasket 94 is axially retained between radially-extending flange 110 and upstream face 98. Gasket 94 is configured to withstand high temperatures, and as such is made from a suitably durable material, such as an FKM fluoroelastomer. End cap 90 is disposed within depression 102 adjacent downstream face 100 of valve guide 88. Fastener 96 extends through retainer 92, gasket 94, valve guide 88, and end cap 90. Fastener 96 can be of any suitable configuration for securing valve member 44 together. In some examples, end cap 90 includes interior threading configured to mate with exterior threading on fastener 96. In other examples, multiple components of valve member 44 can include interior threading, such as valve guide 88, retainer 92, and/or end cap 90, configured to mate with the exterior threading on fastener 96. While fastener 96 has been described as a threaded fastener, it is further understood that fastener 96 can be of any suitable configuration for securing the components of valve member 44 together, such as a press-fit connection, a detent extending from fastener and configured to engage an internal groove in end cap 90, an adhesive, a rivet, or any other suitable configuration. While valve member 44 is described as a multi-part component, it is understood that valve member 44 can be unitarily formed. For example, valve member 44 can be additively manufactured, cast, or machined to have the desired configuration.

Downstream face 100 of valve guide 88 has slope θ, such that downstream face 100 presents an asymmetric profile about longitudinal axis A-A. Downstream face 100 is asymmetric such that spring 42 provides a non-linear force to downstream face 100. The non-linear force is an annularly asymmetric force that acts on valve member 44. As such, less pressure is required to displace a portion of valve member 44 from valve inlet 34 to allow the pressurized air to flow downstream through first check valve 36. In addition, valve member 44 does not fully disengage from valve inlet 34 when the pressure differential overcomes the force of spring 42. Instead, valve member 44 shifts, by tipping, to the modulated position shown in FIG. 3B, where a portion of gasket 94 maintains contact with seat 82 while another portion of gasket 94 is displaced from seat 82. Slope θ can be any desired slope to ensure that the non-linear force applied to downstream face 100 by spring 42 allows a portion of gasket 94 to disengage from seat 82 to provide a flowpath through first check valve 36 while another portion of gasket 94 remains engaged with seat 82. For example, slope θ can be about 10°. Taper 108 extends annularly about outer edge 104 of valve guide 88. Taper 108 assists valve member 44 rocking open in response to the compressor activating and driving pressurized air to a spray gun, such as spray gun 14 (best seen in FIG. 1D).

While valve guide 88 is described as including an asymmetric downstream face 100, it is understood that valve guide 88 can be symmetric while spring 42 can be configured to provide an asymmetric force on valve guide 88. For example, spring 42 can have a non-parallel free length such that spring 42 applies a non-uniform load on valve guide 88. The non-uniform load applied by spring 42 facilitates valve member 44 shifting to the modulated position in response to pressure differentials. In other examples, both valve guide 88 and spring 42 can be configured to facilitate shifting to the modulated position. For example, valve guide 88 can include the sloped downstream face 100 and spring 42 can include a non-uniform free length.

During operation, valve member 44 is initially in the closed position, shown in FIG. 2A. Spring 42 exerts a force on downstream face 100 to maintain valve member 44 in the closed position, where gasket 94 is fully engaged with seat 82. As such, air cannot flow upstream or downstream through first check valve 36 with valve member 44 in the closed position.

The compressor activates and begins to drive compressed air. The pressure drops in the hose downstream of first check valve 36, and the pressure rises upstream of first check valve 36 because of the compressor driving the compressed air. The pressure differential rises until the pressure differential overcomes the force exerted by spring 42 on valve guide 88. Due to the asymmetry of downstream face 100, spring 42 exerts a non-linear spring force on downstream face 100. As such, less force is required to overcome the spring force at point A than at point B because spring 42 is more compressed, and thus generates more force, at point B. The pressure differential initially overcomes the force at point A and causes valve member 44 to rock back on taper 108 and tip open to the modulated position shown in FIG. 2B.

In the modulated position, valve member 44 is tipped open such that valve member 44 is open where spring 42 applies less force and closed where spring 42 applies more force. As such, gasket 94 is disengaged from seat 82 at point A, but gasket 94 is engaged with seat 82 at point B. With valve member 44 in the modulated position, compressed air can flow downstream through first check valve 36. Shifting valve member 44 to the modulated position allows valve member 44 to open a variable degree instead of in a binary manner where gasket 94 either is or is not engaged with seat. Valve member 44 tipping open in response to the pressure differential allows valve member 44 to stably adjust the degree of the opening in response to the air flow provided by the compressor, thereby eliminating chattering and resonance in first check valve 36.

As the pressure differential continues to rise, valve member 44 can shift to the fully open position, shown in FIG. 2C, where the upstream air pressure on valve member 44 is greater than the spring force exerted on downstream face 100 by spring 42 when valve member 44 is in the modulated position. Valve member 44 being in the fully open position allows a greater flow rate of air through first check valve 36.

First check valve 36 provides significant advantages. Spring 42 exerts a non-linear force on valve guide 88 such that different pressure differentials are required to displace various portions of valve guide 88 from seat. As such, valve guide 88 transitions to the modulated position before transitioning to the fully open position, which allows valve member 44 to automatically and stably adjust the degree of the opening based on the air flow provided by the compressor. As such, valve member 44 is not in a binary state, where valve member 44 is either fully open or fully closed, but is instead variable in response to the pressure differential. The valve member 44 shifting to a modulated position eliminates oscillation that can occur in a binary check valve in response to pressure differentials. The oscillation can cause excessive noise, wear, oscillation in the air supply, and vibration in the spray gun. As such, valve member 44 reduces vibration, noise, and wear in first check valve 36 and provides a smooth air supply downstream of first check valve 36.

Figure 3:
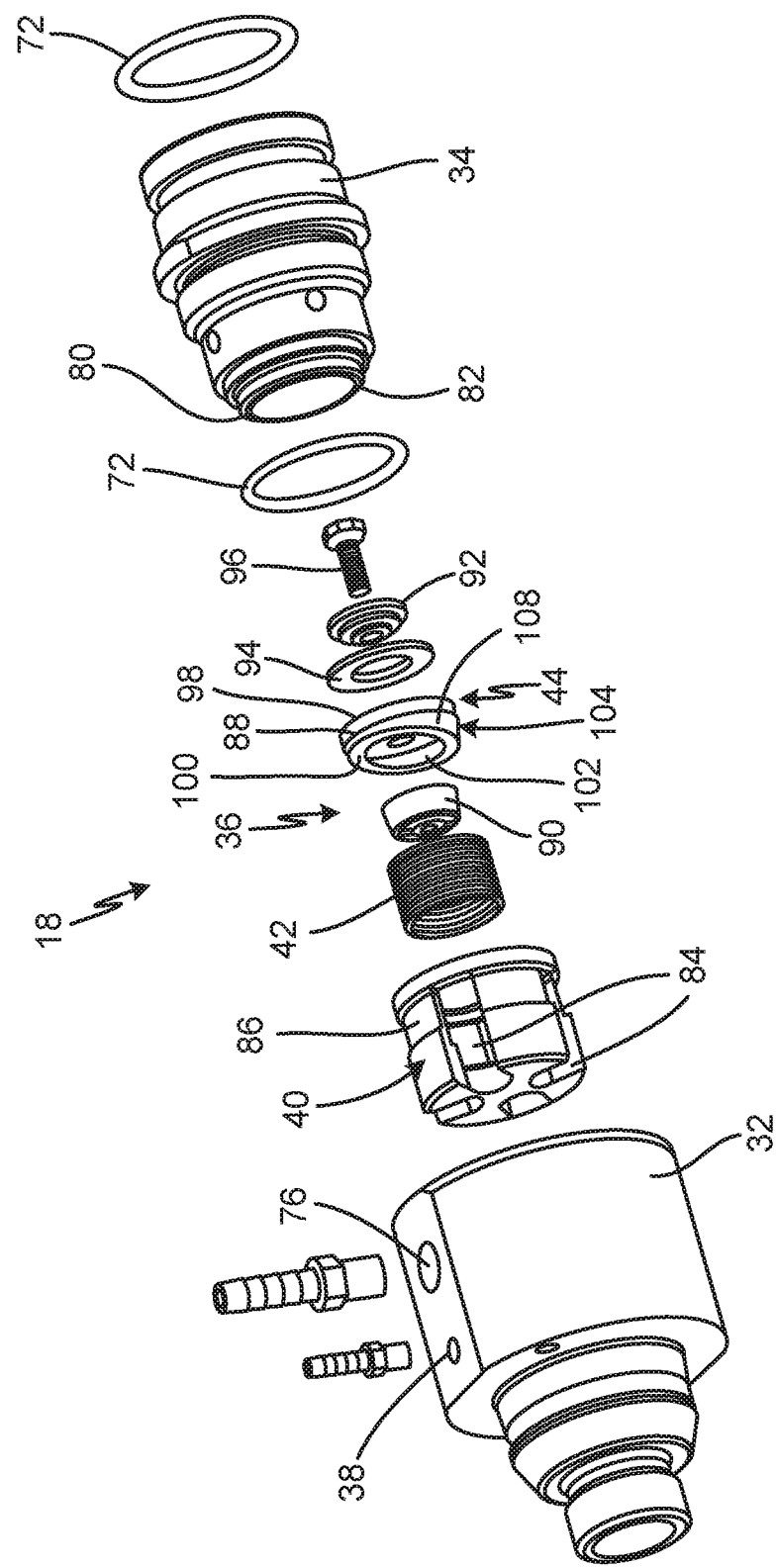
FIG. 3 is an exploded view of a check valve.

FIG. 3 is an exploded view of first fitting 18. First fitting 18 includes valve housing 32, valve inlet 34, first check valve 36, and o-rings 72a and 72b. Pressure port 38 and bleed port 76 of valve housing 32 are shown. Valve inlet 34 includes downstream end 80. First check valve 36 includes cage 40, spring 42, valve member 44, and seat 82. Cage 40 includes flow openings 84 and annular groove 86. Valve member 44 includes valve guide 88, end cap 90, retainer 92, gasket 94, and fastener 96. Valve guide 88 includes upstream face 98, downstream face 100, depression 102, and outer edge 104. Outer edge 104 includes taper 108.

O-ring 72a extends about valve inlet 34 and is configured to provide a seal between valve inlet 34 and valve housing 32. O-ring 72b extends around an upstream end of valve inlet 34 and is configured to provide a seal at the interface between valve inlet 34 and a compressor, such as compressor 24 (best seen in FIG. 1C). Pressure port 38 and bleed port 76 extend through valve housing 32. Pressure port 38 extends through valve housing 32 downstream of first check valve 36, and bleed port 76 extends through valve housing 32 upstream of first check valve 36. Downstream end 80 extends into valve housing 32. Seat 82 extends from downstream end 80. While seat 82 is shown as integrally formed on downstream end 80, it is understood that seat 82 can be separately formed from downstream end 80.

First check valve 36 is disposed in valve housing 32 and is retained in valve housing 32 by valve inlet 34. Cage 40 is disposed in valve housing 32. Flow openings 84 extend through cage 40 and provide flowpaths for air to flow downstream through first check valve 36. Annular groove 86 extends around cage 40 and is aligned with pressure port 38 when first check valve 36 is installed in valve housing 32. Annular groove 86 allows air to flow around cage 40 and to pressure port 38, which is connected to a pressure sensor.

Spring 42 is disposed in cage 40 and is configured to exert a force on valve member 44 to drive valve member 44 towards the closed position (shown in FIG. 2A). Retainer 92 is disposed adjacent upstream face 98 of valve guide 88. Gasket 94 is disposed on upstream face 98 of valve guide 88. Gasket 94 abuts seat 82 to seal the flowpath through first check valve 36. End cap 90 is disposed within depression 102 adjacent downstream face 100 of valve guide 88. Fastener 96 extends through retainer 92, gasket 94, valve guide 88, and end cap 90. Fastener 96 can be of any suitable configuration for securing valve member 44 together. Downstream face 100 of valve guide 88 includes a slope such that spring 42 exerts a nonlinear force on downstream face 100 when valve member 44 is in the closed position. The nonlinear force allows valve member 44 to tip into the modulated position (shown in FIG. 2B) in response to a pressure differential overcoming the force of spring 42.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A high-volume low-pressure (HVLP) spray system for spraying a fluid, the spray system comprising:
   an air control unit configured to generate a flow of pressurized air;

a spray gun configured to spray the fluid with the flow of pressurized air;

a hose extending from the air control unit and configured to provide the flow of pressurized air from the air control unit to the spray gun; and a check valve having a longitudinal axis and including:
  a seat;
  a valve member movable between a closed position in which the valve member is engaged with a seat, a modulated position in which the valve member is tipped partially off of the seat while a portion of an upstream face of the valve member is still engaged with the seat, and an open position in which the valve member is disengaged from the seat; and
  a spring configured to generate an annularly asymmetric force on a downstream face of the valve member to maintain the valve member in the closed position and further configured to be overcome by the flow of the pressurized air such that the flow of the pressurized air causes the valve member to tip open to the modulated position;
  wherein the valve member includes an outer edge shaped such that the valve member rocks on the outer edge as the valve member transitions from the closed position to the modulated position, and such that the valve member slides along the longitudinal axis as the valve member transitions from the modulated position to the open position.

2. The HVLP spray system of claim 1, further comprising:
a fitting attached to the air control unit;
wherein the check valve is disposed within the fitting and has a longitudinal axis, the check valve further comprises:
  a cage disposed within the fitting; and
  the seat disposed at an upstream end of the cage;
wherein the spring is disposed within the cage between a downstream end of the cage and the seat; and
wherein the valve member is disposed within the cage between the spring and the seat such that the valve member slides within the cage as the valve member transitions from the modulated position to the open position.

3. The HVLP spray system of claim 2, wherein the downstream face includes an asymmetric profile about the longitudinal axis.

4. The HVLP spray system of claim 3, wherein the valve member comprises:
a valve guide having the upstream face and the downstream face;
a retainer disposed adjacent the upstream face of the valve guide;
an end cap disposed adjacent the downstream face of the valve guide; and
a fastener extending though and securing the retainer, the valve guide, and the end cap.

5. The HVLP spray system of claim 4, wherein the valve member further comprises:
a gasket at least partially disposed between the retainer and the valve guide, the gasket configured to contact the seat and provide an airtight seal with the valve member in the closed position.

6. The HVLP spray system of claim 4, wherein:
the upstream face of the valve guide includes an axially-extending flange;
the retainer includes a radially-extending flange; and
the gasket is radially retained between the axial flange and the retainer and is axially retained between the radial flange and the upstream face.

7. The HVLP spray system of claim 4, wherein the valve guide includes a depression, the end cap disposed in the depression.

8. The HVLP spray system of claim 2, wherein the fitting comprises:
a housing including a central bore; and
an inlet extending into an upstream end of the central bore and attached to the housing;
wherein the cage is retained within the central bore between a downstream lip of the housing and a downstream end of the inlet.

9. The HVLP spray system of claim 8, wherein the downstream end of the inlet forms the seat.

10. The HVLP spray system of claim 8, wherein the housing further comprises:
a port extending through the housing and into the central bore downstream of the downstream end of the inlet, the port in communication with a pressure sensor and configured to provide the pressurized air to the pressure sensor.

11. The HVLP spray system of claim 10, wherein the cage includes an annular groove extending about the cage and aligned with the pressure port.

12. The HVLP spray system of claim 2, wherein the spring comprises a flat wire coil spring.

13. A check valve comprising:
a valve member movable between a closed position, a modulated position, and an open position, the valve member including a downstream face, an upstream face, and an outer edge;
  wherein the valve member is engaged with a seat of the check valve with the valve member in the closed position;
  wherein a first portion of the upstream face is tipped partially off of the seat and a second portion of the upstream face is engaged with the seat with the valve member in the modulated position; and
  wherein the valve member is disengaged from the seat with the valve member in the open position; and
a spring that provides an annularly asymmetric force on the downstream face of the valve member with the valve member in the closed position to maintain the valve member in the closed position;
  wherein the spring provides an annular force on the downstream face of the valve member with the valve member in the modulated position;
  wherein the valve member is configured to tilt from the closed position to the modulated position prior to sliding from the modulated position to the open position when actuating from the closed position to the open position.

14. The check valve of claim 13, further comprising:
a cage; and
a seat disposed at an upstream end of the cage;
wherein the spring is disposed in the cage; and
wherein the valve member is disposed within the cage between the spring and the seat, the upstream face of the valve member facing the seat and the downstream face of the valve member facing the spring.

15. The check valve of claim 14, wherein the valve member further comprises:
a valve guide having an upstream face and a downstream face;

a retainer disposed adjacent the upstream face of the valve guide;
an end cap disposed adjacent the downstream face of the valve guide; and
a fastener extending though and securing the retainer, the valve guide, and the end cap;
wherein the downstream face of the valve guide includes the asymmetric profile about the longitudinal axis of the check valve.

16. The check valve of claim 15, wherein an outer edge of the valve guide includes a taper extending to the downstream face.

17. The check valve of claim 15, wherein the valve guide, the retainer, the end cap, and the fastener are disposed coaxially.

18. The check valve of claim 14, further comprising:
a valve housing having a central bore, wherein the cage is disposed within the central bore;
a valve inlet extending into an upstream end of the valve housing, wherein a downstream end of the valve inlet forms the seat;
wherein the cage is retained within the central bore by the valve inlet.

19. A check valve comprising:
a cage; and
a seat disposed at an upstream end of the cage;
a valve member movable between a closed position, a modulated position, and an open position, the valve member comprising:
a valve guide having an upstream face and a downstream face;
a retainer disposed adjacent the upstream face of the valve guide;
an end cap disposed adjacent the downstream face of the valve guide; and
a fastener extending though and securing the retainer, the valve guide, and the end cap;
wherein the downstream face of the valve guide includes the asymmetric profile about the longitudinal axis of the check valve; and
a spring disposed in the cage, the spring providing an annularly asymmetric force on a downstream face of the valve member to maintain the valve member in the closed position;
wherein the valve member is configured to tilt to the modulated position prior to sliding to the open position when actuating from the closed position to the open position, and wherein a portion of an upstream face of the valve member maintains engagement with a seat when the valve member is in the modulated position and another portion of the upstream face is disengaged from the seat when in the modulated position;
wherein the valve member is disposed within the cage between the spring and the seat, the upstream face of the valve member facing the seat and the downstream face of the valve member facing the spring.

20. A high-volume low-pressure (HVLP) spray system for spraying a fluid, the spray system comprising:
an air control unit configured to generate a flow of pressurized air;
a spray gun configured to spray the fluid with the flow of pressurized air;
a fitting attached to the air control unit;
a hose extending from the fitting and configured to provide the flow of pressurized air from the air control unit to the spray gun; and
the check valve of claim 19 disposed in the fitting.

* * * * *